UNITED STATES PATENT OFFICE.

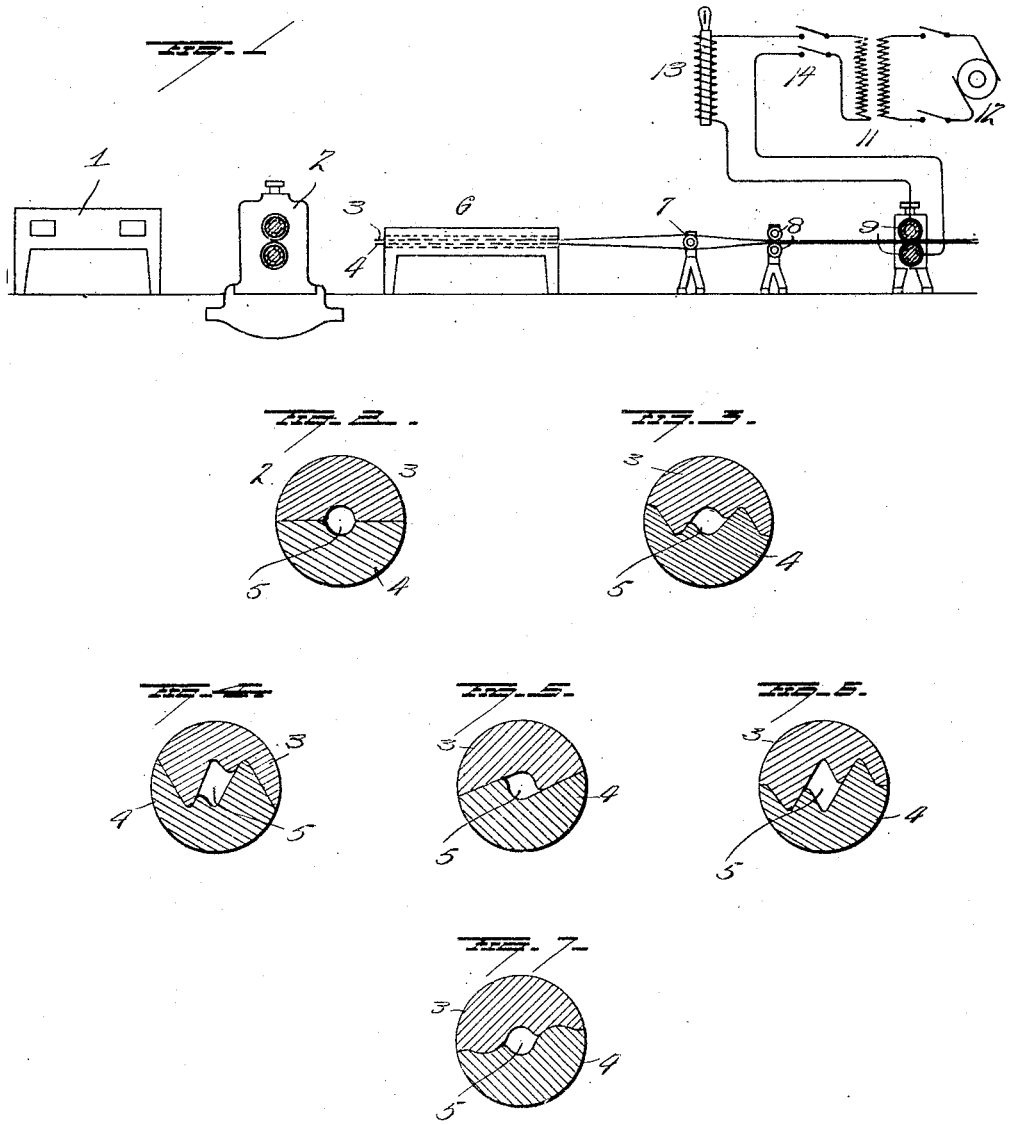

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

MANUFACTURE OF COMPOSITE BARS.

1,364,695.    Specification of Letters Patent.    Patented Jan. 4, 1921.

Application filed February 21, 1917. Serial No. 150,196.

*To all whom it may concern:*

Be it known that we, JOHN R. FLANNERY and ETHAN I. DODDS, citizens of the United States, and residents of Pittsburgh, in the county of Allegheny and State of Pennsylvania, have invented certain new and useful Improvements in Manufacture of Composite Bars; and we do hereby declare the following to be a full, clear, and exact description of the invention, such as will enable others skilled in the art to which it appertains to make and use the same.

This invention relates to the manufacture of composite bars suitable for the manufacture of staybolts having telltale holes.

Heretofore it has been proposed to construct tubular bars comprising two parts welded together, but with the methods heretofore employed, great difficulty has been experienced in effecting perfect welded unions between the two parts owing to the presence of scale on the abutting surfaces, and from other causes, and it has also been found to be difficult and even impossible to assure the formation of a clear, straight bore such as is important when the bar is employed for the manufacture of headed staybolts for boilers.

The object of our present invention is to obviate the defects heretofore encountered in the manufacture of staybolts bars comprising two parts welded together, and to provide a process of manufacturing such welded bars, whereby the same may be formed of considerable length with perfect welded unions not liable to open when the bar is made up into headed staybolts or subsequently to the manufacture of such staybolts and so that an unobstructed bore shall be insured in the bar and in the staybolts made therefrom.

With these and other objects in view, the invention consists in certain novel steps in the method of manufacturing composite tubular bars, as hereinafter set forth and pointed out in the claims.

In the accompanying drawings; Figure 1 is a diagrammatical view showing apparatus whereby our improved method may be effected, and Figs. 2, 3, 4, 5, 6 and 7 are views showing various cross sections which may be given the two welded parts forming the composite tubular bar.

1 represents a suitable furnace from which the iron is passed between reducing rollers indicated at 2. These rollers have such contour as will cause the strip of iron being reduced to have the desired cross section of one of the parts or members of the finished tubular bar from which staybolts may be made. The two parts or members 3—4 composing the finished tubular bar may be made of various shapes in cross section, but in every instance the shape of the inner faces of said parts or bar members is such that when the two members are placed together and welded, a central hole or bore 5 will be formed. In the form shown in Fig. 2, the respective members of the bar are made with grooves to form the central bore 5 and the contacting faces of the two members are coincident with a straight line passing transversely through the bar. In Figs. 3 to 7 the contacting faces constituting the welded union between the two members are made of various shapes so as to present contacting surfaces which will be inclined or disposed at angles to a straight line passing transversely through the bar. Such formation of the bar members will be found to be advantageous when assembling the two members to be welded, in that a rubbing engagement between the two members will be effected during the act of pressing the two members together and thus the welding surfaces will be freed of scale or other matter which might interfere with the formation of a perfect weld.

When the members composing a bar shall have been reduced by the forming rolls, in long lengths of thirty feet, more or less, the two bar members are run (while still hot) into a long furnace 6 where they are kept in a proper heated condition. As the two bar members emerge from one end of the furnace 6, they will be separated in any suitable manner (as with the use of tongs) and caused to pass respectively above and below a clearing device, such as a brush or emery wheel 7, whereby the surfaces of the bar members which subsequently form the welded union will be cleaned of scale or other foreign matter. After leaving the cleaning device 7, the two bar members may be passed between guide rollers 8, which may act to press said members together. The two bar members properly juxtaposed and in contact with each other will be immediately passed between welding rollers 9. These rollers not only press the two bar members together but they also constitute the electrodes of electrical welding means. For this purpose, the welding rollers or rolling electrodes may be included in the circuit of a suitable source of electrical energy. In the drawing, we have shown the rollers 9 as being included in a circuit 10 of the secondary of a transformer, shown diagrammatically at 11,—the primary of said transformer being connected with a suitable source of alternating current, as indicated at 12. The circuit 10 which supplies current to the welding rollers may include a suitable adjustable induction resistance device 13, and said circuit may also be provided with a suitable switch 14.

As the composite or two-part bar passes between the rollers 9, and is included in the circuit of said rollers, the contacting faces of the two bar members will be intimately and effectually welded together, and as this welding action is continuous during the passage of the bar members between the welding rollers, composite bars of considerable length (thirty feet more or less) may be formed with the two members thereof effectually welded together and with the central bore straight and clear of obstruction. The bar thus formed will be suitable for the manufacture of staybolts for boilers and possibility of the opening of the welded seams of the bolts when the latter are in place in a boiler, will be obviated.

Having fully described our invention what we claim as new and desire to secure by Letters-Patent, is:—

1. The herein described method, consisting in reducing metal stock and thereby forming bar members having curved outer faces and grooved inner faces, mating such bar members to form a bar having a bore; then heating the mated bar members, and then passing the mating bar members between rollers included in an electric circuit, whereby the preheated mating bar members will be pressed together and simultaneously electrically welded.

2. The herein described method, consisting in forming mating bar members having grooves to form a central bore in a finished bar, assembling said bar members, maintaining heat in the assembled members, then subjecting the contacting faces of said members to cleaning means, and then passing the contacting members between rolling electrodes included in a source of electric energy.

3. The herein described method, consisting in forming mating bar members having contacting faces disposed at an angle to a straight line passing transversely through the assembled members, passing the mated bar members while hot between rolling electrodes, and including said electrodes in a circuit of a source of electric energy.

In testimony whereof we have signed this specification in the presence of two subscribing witnesses.

JOHN ROGERS FLANNERY.
ETHAN I. DODDS.

Witnesses:
F. H. ALLISON,
EDWIN S. RYCE.